United States Patent
Giraud et al.

(10) Patent No.: US 12,036,956 B2
(45) Date of Patent: Jul. 16, 2024

(54) SYSTEM FOR CLEANING AT LEAST TWO SENSORS/TRANSMITTERS FOR A MOTOR VEHICLE

(71) Applicant: VALEO SYSTEMES D'ESSUYAGE, La Verriere (FR)

(72) Inventors: Frederic Giraud, La Verriere (FR); Alexandre Filloux, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 362 days.

(21) Appl. No.: 17/439,895

(22) PCT Filed: Mar. 18, 2020

(86) PCT No.: PCT/EP2020/057528
§ 371 (c)(1),
(2) Date: Sep. 16, 2021

(87) PCT Pub. No.: WO2020/193328
PCT Pub. Date: Oct. 1, 2020

(65) Prior Publication Data
US 2022/0185240 A1 Jun. 16, 2022

(30) Foreign Application Priority Data
Mar. 26, 2019 (FR) .................... 1903113

(51) Int. Cl.
*G01M 3/26* (2006.01)
*B60S 1/48* (2006.01)
(Continued)

(52) U.S. Cl.
CPC ............ *B60S 1/481* (2013.01); *B60S 1/50* (2013.01); *B60S 1/56* (2013.01); *G01M 3/26* (2013.01)

(58) Field of Classification Search
CPC .. B60S 1/481; B60S 1/50; B60S 1/56; G01M 3/26; F04D 13/00; F04D 15/0088
See application file for complete search history.

(56) References Cited

U.S. PATENT DOCUMENTS 5,475,614 A * 12/1995 Tofte .................... G05D 7/0635
700/283
6,669,110 B2 12/2003 Fukushima
(Continued)

FOREIGN PATENT DOCUMENTS

CN 104228776 A 12/2014
CN 108622028 A 10/2018
(Continued)

OTHER PUBLICATIONS

China National Intellectual Property Administration, Office Action of corresponding Chinese Application No. 202080031568.3, dated Apr. 27, 2023.
(Continued)

*Primary Examiner* — Sohana Tanju Khayer
(74) *Attorney, Agent, or Firm* — Valeo Systemes d'Essuyage

(57) ABSTRACT

The present invention relates to a system for cleaning at least two sensors/transmitters for a motor vehicle, the system comprising at least one first device for projecting a cleaning fluid onto at least one first sensor/transmitter, at least one second device for projecting a cleaning fluid onto at least one second sensor/transmitter, at least one reservoir, at least one circuit for distribution of the cleaning fluid, connecting the reservoir to the first and second projection devices, at least one electronic pump, and at least one control unit, characterized in that the control unit is configured to receive information on a request for activation of the first and/or
(Continued)

second projection device(s) in order to determine a theoretical value of at least one operating parameter of a pump.

10 Claims, 3 Drawing Sheets

(51) Int. Cl.
  *B60S 1/50* (2006.01)
  *B60S 1/56* (2006.01)

(56) References Cited

U.S. PATENT DOCUMENTS

| | | | |
|---|---|---|---|
| 9,290,158 B2 | 3/2016 | Dominique et al. | |
| 10,286,880 B2 | 5/2019 | Schmidt et al. | |
| 2003/0047621 A1* | 3/2003 | Fukushima | B60S 1/481 239/284.1 |
| 2004/0171480 A1* | 9/2004 | Hampden-Smith | C22C 32/0084 502/185 |
| 2007/0028674 A1* | 2/2007 | Beiderman | G01M 3/26 73/40.5 R |
| 2014/0246506 A1* | 9/2014 | Maas | B29C 66/4312 239/302 |
| 2016/0138708 A1* | 5/2016 | Kim | F16H 61/12 701/62 |
| 2018/0290632 A1* | 10/2018 | Rice | B60S 1/56 |
| 2019/0011429 A1* | 1/2019 | Taagaard | G01N 33/4905 |
| 2020/0001834 A1* | 1/2020 | Grasso | B60S 1/52 |
| 2020/0122691 A1 | 4/2020 | Werner et al. | |

FOREIGN PATENT DOCUMENTS

| | | |
|---|---|---|
| DE | 102017206469 A1 | 10/2018 |
| JP | 2000240847 A | 9/2000 |
| JP | 2003137076 A | 5/2003 |
| JP | 2005075215 A | 3/2005 |
| JP | 2015231765 A | 12/2015 |
| KR | 20160003518 A | 1/2016 |
| WO | 2018230255 A1 | 12/2018 |

OTHER PUBLICATIONS

European Patent Office, International Search Report (including English translation) and Written Opinion of corresponding International Application No. PCT/EP2020/057528, dated May 20, 2020.

Japanese Patent Office, Office Action (including English translation) of corresponding Japanese Application No. 2021-557153, dated Sep. 27, 2022.

European Patent Office, Office Communication of corresponding European Application No. 20710565.1, dated Oct. 4, 2022.

* cited by examiner

SYSTEM FOR CLEANING AT LEAST TWO SENSORS/TRANSMITTERS FOR A MOTOR VEHICLE

CROSS-REFERENCE TO RELATED APPLICATIONS

This is a 371 application (submitted under 35 U.S.C. § 371) of International Application No. PCT/EP2020/057528 (WO2020/193328) filed on Mar. 18, 2020, which claims the priority date benefit of French Application No. FR1903113 filed on Mar. 26, 2019, the disclosures of which are hereby incorporated by reference in their entirety.

TECHNICAL FIELD

The present invention concerns the field of cleaning sensors/transmitters for a motor vehicle, and more particularly the present invention concerns a cleaning system able to detect a problem such as a leak or an obstruction in the pipes arranged between a cleaning fluid reservoir and the sensors/transmitters to be cleaned.

BACKGROUND

Modern motor vehicles contain ever more driving aid systems which are intended to render the vehicle autonomous in ever more varying situations. Such driving aid systems comprise in particular sensors and transmitters which allow the vehicle or driver, depending on the degree of autonomy of the vehicle, to obtain data on the environment of the vehicle in order to make driving decisions.

SUMMARY

It is essential that these driving aid systems are secure and always operational. Thus the sensors/transmitters must always be clean such that the data acquisition is as good as possible.

The vehicles thus comprise, in the known fashion, systems for cleaning these sensors/transmitters which are controlled so as to provide a cleaning function when the sensors/transmitters are not clean enough to operate correctly. These cleaning systems in particular comprise at least one cleaning fluid reservoir, at least one projection device able to project said cleaning fluid onto the sensors/transmitters, and at least one distribution circuit connecting the cleaning fluid reservoir to the projection nozzles.

However, these cleaning systems are not totally satisfactory in that no information is received with respect to the correct supply of these projection devices, and in particular with respect to the state of the distribution circuit. For example, these cleaning systems today do not allow detection of a leak or obstruction in the distribution circuit.

The present invention lies in this context and aims to rectify at least the problem outlined above by proposing a system for cleaning at least two sensors/transmitters for a motor vehicle, the system comprising at least one first device for projecting a cleaning fluid onto at least one first sensor/transmitter, at least one second device for projecting a cleaning fluid onto at least one second sensor/transmitter, at least one reservoir for storage of the cleaning fluid, at least one circuit for distribution of the cleaning fluid, connecting the reservoir to the first and second cleaning fluid projection devices, at least one electronic pump, and at least one control unit. According to the invention, the control unit is configured to receive information on a request for activation of the first and/or second device for projection of the cleaning fluid in order to determine a theoretical value of at least one operating parameter of a pump, as a function of firstly a length of a portion of the distribution circuit extending between the reservoir and the first and/or second cleaning fluid projection device(s) to be activated, and secondly a desired operating pressure of the first and/or second projection device(s), in order to compare the theoretical value of the operating parameter of the pump with an actual value of the operating parameter of the pump and in order to determine a state of said portion of the cleaning fluid distribution circuit as a function of the result of said comparison.

The term "distribution circuit" in the present application refers both to a hydraulic network which serves each of the projection devices connected to this network, and to independent pipes which serve each projection device independently of the others. It is understood that by taking into account the length of the portion concerned of the distribution circuit, load losses of the cleaning fluid observed on said circuit portion may be taken into account in order to determine the theoretical value of the pump operating parameter as accurately as possible.

According to a characteristic of the present invention, the control unit is configured for determining information on a leak in the portion of the cleaning fluid distribution circuit if the actual value of the operating parameter of the pump is less than the theoretical value of the operating parameter of the pump, and if the difference between the actual value and the theoretical value of the operating parameter is greater than or equal to 5% of the theoretical value of the operating parameter of the pump.

According to another characteristic of the present invention, the control unit is configured for determining information on an obstruction in the portion of the cleaning fluid distribution circuit if the actual value of the operating parameter of the pump is greater than the theoretical value of the operating parameter of the pump, and if the difference between the actual value and the theoretical value of the operating parameter is greater than or equal to 5% of the theoretical value of the operating parameter of the pump.

According to an embodiment of the present invention, the operating parameter of the pump is a rotation speed of said pump or an electrical supply to said pump. For example, it is checked that the actual electrical supply corresponds to the electrical supply which is normally required to achieve the desired pump rotation speed, this desired pump rotation speed being determined as a function of the length of the distribution circuit portion and of the desired operating pressure of the first and/or second projection device(s).

According to a characteristic of the invention, the control unit and the pump are two separate elements. According to this characteristic of the present invention, the pump comprises at least one command unit which contains at least an optimal operating curve of said pump. This command unit specific to the pump also comprises means for communication with the control unit of the cleaning system according to the invention. The cleaning system control unit comprises load loss curves for the various circuit portions extending between the reservoir and each of the cleaning fluid projection devices. Advantageously, the fact that the command unit of the electronic pump and the control unit of the cleaning system can communicate allows the standardization of these elements without the need to program them for each new installation on a given vehicle, i.e. without the need to manually store the pump operating parameters in the cleaning system control unit or manually store the load loss curves of the different portions of the distribution circuit in the pump command unit.

The invention also concerns a method for implementing a cleaning system according to the invention, comprising a step during which the control unit receives information concerning a request for projection of cleaning fluid at a given pressure by the first and/or the second cleaning fluid projection device(s), a step during which the control unit selects, from a plurality of load loss curves, the curve corresponding to the portion of the distribution circuit extending between the reservoir and the first and/or second cleaning fluid distribution device(s) to be activated, and a step during which the control unit selects an operating curve of the pump which allows the obtaining of a determined pressure as a function of the load loss curve previously selected.

In other words, it is understood that the pump operating curve is selected as a function of the length of the portion of the distribution circuit which must be supplied, the load losses along a circuit being directly linked to its length, and of the desired pressure for the first and/or second projection device(s). The pump operating curve may itself for example be a curve representing pressure as a function of the flow of the cleaning fluid for a given pump rotation speed.

According to the invention, the method also comprises a step during which the control unit determines a theoretical electrical supply of the pump corresponding to the selected operating curve, a step during which the control unit measures the electrical supply actually supplied to the pump in order to achieve the selected operating curve, a step during which the control unit compares the theoretical electrical supply of the pump with the electrical supply actually supplied to the pump, and a step during which the control unit determines a state of the portion of the distribution circuit as a function of the comparison made between the theoretical electrical supply of the pump and the actual electrical supply of said pump.

According to a characteristic of the invention, the method comprises a step during which the control unit determines information on a leak in a portion of the cleaning fluid distribution circuit when a value of the actual electrical supply of the pump is less than a value of the theoretical electrical supply of the pump.

According to another characteristic of the invention, the method comprises a step during which the control unit determines information on an obstruction in the cleaning fluid distribution circuit when a value of the actual electrical supply of the pump is greater than a value of the theoretical electrical supply of the pump.

Advantageously, when two projection devices are activated simultaneously and the control unit detects a leak or obstruction in the portion concerned of the distribution circuit, the control unit may also be configured to issue an instruction for activation of the first projection device and an instruction for closure of the second projection device and for restarting the method just described. Thus the control unit may refine the result of its first comparison and provide information on a state of a portion of the distribution circuit extending between the reservoir and the first projection device and another portion of the distribution circuit extending between the first projection device and the second projection device.

The invention also concerns a motor vehicle which comprises at least one cleaning system according to the invention and a plurality of sensors/transmitters, wherein at least one cleaning fluid projection device is associated with each sensor/transmitter, a cleaning fluid distribution circuit connects the cleaning fluid reservoir to all the devices for projecting said fluid, and wherein a length of the cleaning fluid distribution circuit measured between the cleaning fluid reservoir and any of the cleaning fluid projection devices is different from a length of the cleaning fluid distribution circuit measured between the cleaning fluid reservoir and another cleaning fluid projection device.

BRIEF DESCRIPTION OF THE DRAWINGS

Further features, details and advantages of the invention will become more clearly apparent from reading the following description, and also from a number of exemplary embodiments given by way of non-limiting indication, with reference to the appended schematic drawings, in which.

DETAILED DESCRIPTION

The features, variants and different embodiments of the invention may be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage or to distinguish the invention from the prior art.

Figure 1:
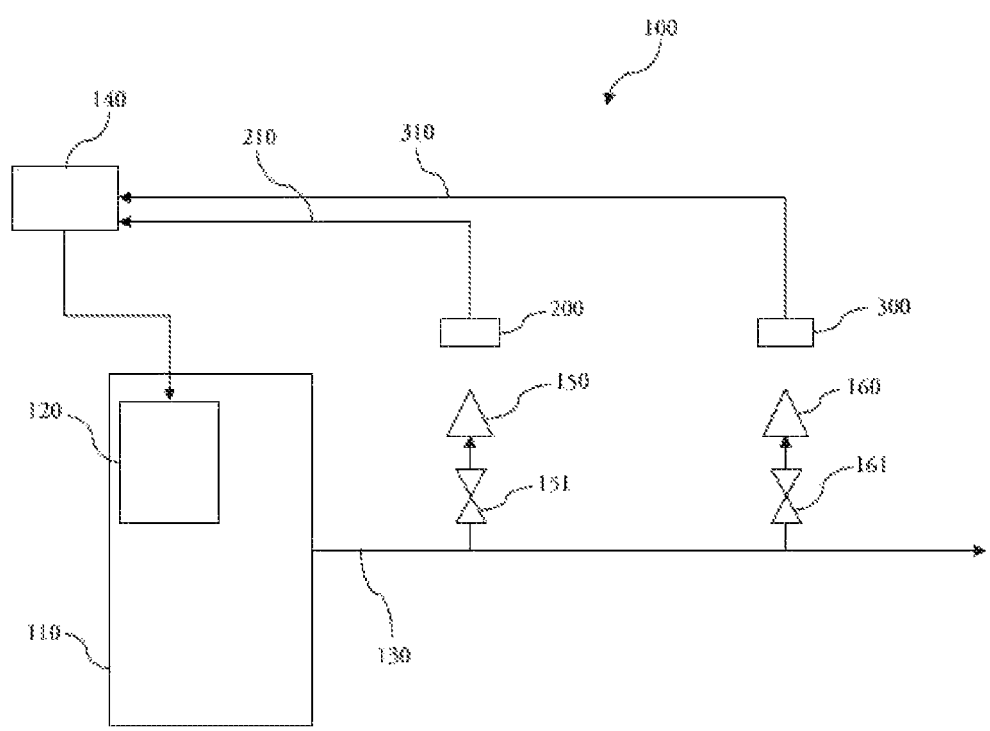
FIG. 1 illustrates schematically a system for cleaning at least two sensors/transmitters according to the present invention.

FIG. 1 illustrates schematically a system 100 for cleaning at least two sensors/transmitters 200, 300 according an exemplary embodiment of the present invention. As shown, the cleaning system 100 comprises at least one cleaning fluid reservoir 110, at least one electronic pump 120, at least one cleaning fluid distribution circuit 130, at least one control unit 140, at least one first projection device 150 configured to project the cleaning fluid onto a first sensor/transmitter 200 and at least one second projection device 160 configured for projecting cleaning fluid onto a second sensor/transmitter 300. According to the invention, the first and second projection devices 150, 160 may be identical or different without leaving the context of the present invention.

According to a first exemplary embodiment of the present invention, the cleaning fluid distribution circuit 130 is formed by a hydraulic network on which the projection devices 150, 160 are connected. In other words, this hydraulic network allows supply of all these projection devices 150, 160, wherein each of these devices is connected to the hydraulic network. It is understood that the fluid is available on the network and that selection of the supply is this achieved by means of at least one first valve 151 associated with the first projection device 150 and at least one second valve 161 associated with the second projection device 160. According to another exemplary embodiment (not illustrated here), the cleaning fluid distribution circuit 130 comprises independent pipes which supply each of the projection devices independently of one another. According to any of these embodiments, the cleaning fluid distribution circuit 130 extends from the reservoir 110 containing this cleaning fluid and allows the supply of each of the projection devices 150, 160 which allows projection of the cleaning fluid onto the sensors/transmitters 200, 300.

As mentioned above, the reservoir 110 houses an electronic pump 120. This electronic pump 120 comprises a command unit (not shown here) which contains means of communication allowing this electronic pump 120 to exchange information and instructions with the control unit 140. Alternatively, it could be provided that the control unit 140 and the command unit form a single entity without leaving the context of the present invention.

According to the invention, when one of the sensors/transmitters 200, 300 requires cleaning, information 210, 310 to this effect is transmitted to the control unit 140 of the cleaning system 100 according to the invention. According to the example illustrated on FIG. 1, this information 210, 310 is transmitted directly by the sensor/transmitter which needs cleaning, but it is understood that this information 210, 310 could be transmitted by another device without leaving the context of the present invention. For example, the images detected by the sensor/transmitter 200, 300 are analysed by an image processing module in order, where applicable, to implement a driving assistance strategy, and this processing module may estimate that one and/or the other of the sensors/transmitters requires cleaning and can send the information 210, 310 to the control unit.

The control unit 140 which receives this information 210, 310 then determines which portion of the circuit 130 must be supplied with cleaning fluid and thus determines a length of this portion of the circuit. This length of the circuit in practice reflects the level of load losses suffered by the cleaning fluid during its transport from the reservoir 110 to the projection devices 150, 160. More precisely, the control unit 140 is implemented with load loss curves which associate a given load loss with each portion of the distribution circuit 130, this load loss being proportional to the length of the portion concerned of the distribution circuit.

In order to ensure optimal cleaning of the sensors/transmitters 200, 300 concerned, a minimum pressure P1 for projection of the fluid at the first and/or second projection device(s) 150, 160 should be ensured. The control unit 140 is here programmed with the desired theoretical pressures for fluid projection in each of the projection devices, the theoretical pressure here being the same for each of the injection devices and substantially equal to 3 bar.

As will be explained in more detail below, the control unit 140 according to the invention is configured to determine at least one theoretical operating parameter of the pump 120, as a function firstly of the desired minimum pressure P1 at the first and/or second projection device(s) 150, 160, and secondly as a function of the length of the portion concerned of the distribution circuit 130, i.e. more precisely as a function of the load loss suffered by the cleaning fluid between the reservoir 110 and the projection device 150, 160 concerned.

For example, the at least one theoretical operating parameter of the pump 120 is a rotation speed of said pump 120. In order to allow the control unit 140 to determine the theoretical operating parameter of the pump 120, theoretical value curves of the operating parameter of the pump 120 are prestored in the control unit 140. An example of these curves is illustrated for example in FIG. 2.

As mentioned above, the control unit 140 comprises communication means enabling it to communicate with the command unit of the electronic pump. Such communication means allow communication between the control unit 140, which is implemented with the load loss curves corresponding to each of the portions of the distribution circuit as mentioned above, and the electronic pump 120 which is itself implemented with the characteristics of the first and second projection devices 150, 160. These characteristics comprise for example operating pressure values of these projection devices 150, 160. Advantageously, this allows the standardization of these elements, i.e. standardization of the control unit 140 and the electronic pump 120, without the need to program them for each new installation on a given vehicle, i.e. without the need to manually store the pump operating parameters or the characteristics of the projection devices in the control unit 140 of the cleaning system 100, or manually store the load loss curves of the different portions of the distribution circuit 130 in the command unit of the electronic pump 120.

Figure 2:
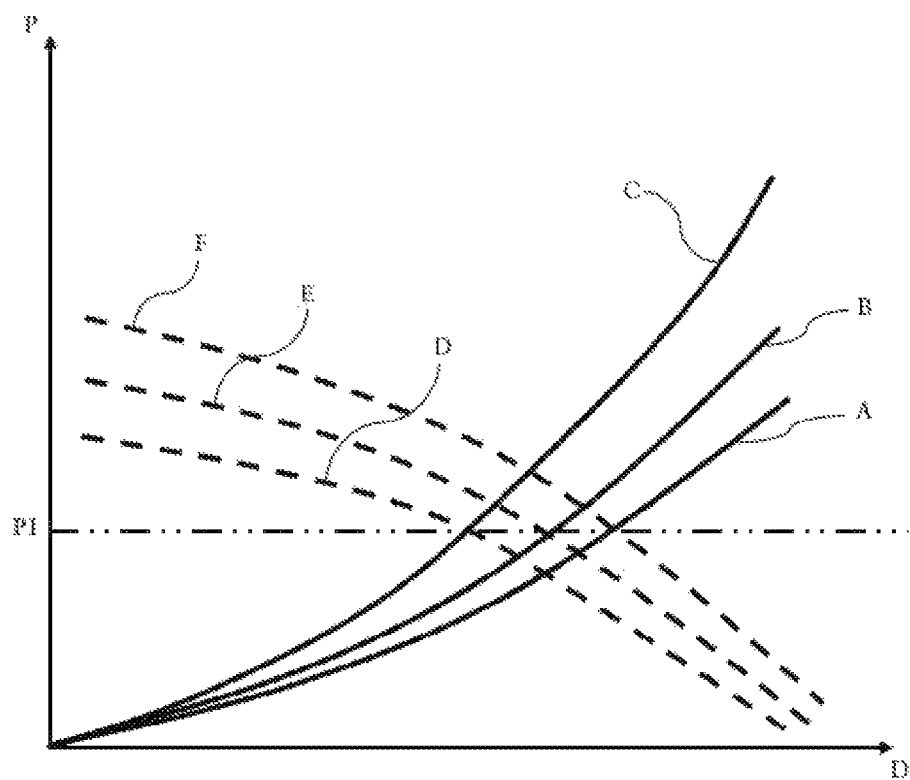
FIG. 2 illustrates a graph forming the basis for a control unit of the cleaning system according to the invention for optimizing the function of this cleaning system.

FIG. 2 shows a graph in which the abscissa shows a flow D of cleaning fluid and the ordinate shows a pressure P at the projection devices 150, 160. The graph shows three curves A, B, C in solid lines, which represent the load loss suffered by the cleaning fluid as a function of the projection device it supplies, i.e. as a function of the length of the portion of the distribution circuit through which the cleaning fluid must pass from the reservoir, and as a function of the number of projection devices to be supplied.

These curves A, B, C are obtained for example by calibration tests performed on the vehicle for which the cleaning system according to the invention is intended. Alternatively, these curves A, B, C are advantageously obtained by values given by the suppliers of the electronic pump and the projection devices.

Thus curve A represents the cleaning fluid load loss when the first sensor/transmitter requires cleaning and only the first projection device is activated, curve B represents the cleaning fluid load loss when the second sensor/transmitter requires cleaning and only the second projection device is activated, and curve C represents the cleaning fluid load loss when the first and second sensors/transmitters require cleaning simultaneously and the first and second projection devices are both activated. According to the exemplary embodiment of the present invention shown here, these load loss curves are implemented in the cleaning system control unit.

It is also noted that three curves D, E, F are shown in dotted lines on this graph. These three curves D, E, F represent three rotation speed profiles of the electronic pump. Thus curve D represents an operation of the electronic pump at low rotation speed, curve E represents an operation of the electronic pump at medium rotation speed, and curve F represents an operation of the electronic pump at high speed. According to the exemplary embodiment of the present invention shown here, these curves D, E, F are implemented in the electronic pump command unit of the cleaning system.

Thus from the graph shown on FIG. 2, the control unit initially selects one of the three load loss curves A, B, C as a function of the portion of the distribution circuit to be supplied. Once this curve has been selected, the control unit deduces therefrom a pair of values, i.e. which flow corresponds to the desired pressure value P1 at the level of the projection devices, and then searches amongst the pump operating curves D, E, F for the one which allows association of this pair of values.

Thus for example, if a cleaning request is formulated by the first sensor/transmitter and by the second sensor/transmitter simultaneously, and if it is desired to supply the first projection device and the second projection device with a pressure P1, the control unit reads on the graph that the electronic pump should be set in operation at low speed, i.e. according to curve D, because the load loss curve corresponding to the portion of the circuit to be supplied, i.e. curve C, passes through this curve D for pressure P1. Accordingly, the control unit determines which electrical supply is theoretically necessary for the electronic pump to achieve this low speed and thus ensure the required pressure P1 at the projection devices.

Figure 3:
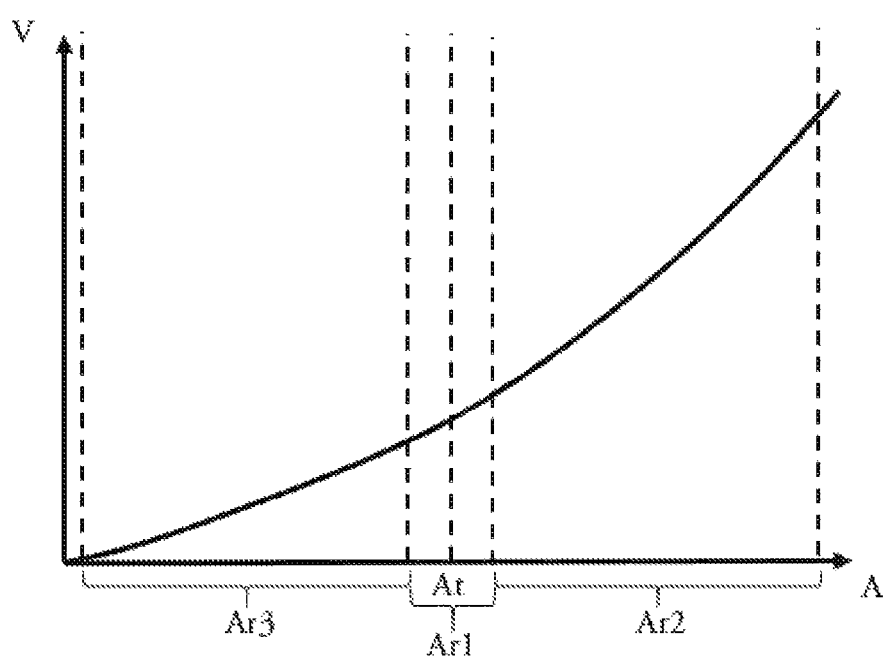
FIG. 3 illustrates another graph forming the basis for a control unit of the cleaning system according to the invention for detecting a state of a distribution circuit of this cleaning system.

The control unit then sets the electronic pump in operation at the desired speed and measures the actual value of the electrical supply of the pump, i.e. the control unit then measures the value of the electrical supply actually necessary for operation of the electronic pump at the desired speed. The control unit can thus compare the theoretical value of the electrical supply of the pump with a real value measured thanks to another curve installed in the command unit of the electronic pump and illustrated on FIG. 3. FIG. 3 thus shows the rotation speed V of the electronic pump as a function of the electrical supply A provided. If the theoretical value At is equal to the actual value Ar1, then the distribution circuit—and more particularly the portion concerned of the distribution circuit—is in good condition. However, if the theoretical value At is less than the actual value Ar2, the portion concerned of the distribution circuit is obstructed between the reservoir and the projection device furthest away from the reservoir, i.e. the second projection device in the example illustrated on FIG. 1. However, if the theoretical value At is greater than the actual value Ar3, the portion concerned of the distribution circuit has a leak between the reservoir and the projection device furthest away from the reservoir, i.e. the second projection device in the example illustrated on FIG. 1. An acceptable margin for error should also be determined. According to an example of the invention described here, a standard deviation of less than 5% is considered insignificant.

The control unit may then be configured to send a signal warning the user(s) of the vehicle equipped with such a cleaning system that a fault has been detected on the distribution circuit. It is also conceivable that the signal is made either more or less alarming, for example with a graduation of colours, depending on the difference measured between the actual value and theoretical value.

It is understood from the above that the control unit 140 allows detection of a leak or obstruction on the distribution circuit between the reservoir and the last projection device supplied, i.e. the projection device furthest away from the reservoir, but does not allow precise location of this leak or obstruction in the distribution circuit. In particular, a degree of uncertainty may persist with respect to location of the detected leak or obstruction when the projection devices are connected to a hydraulic network, as illustrated for example in FIG. 1. Optionally, when there is such uncertainty about the damaged circuit portion, the control unit may be configured to perform a new operation activating only one of the projection devices, in order to better target the leak or obstruction detected and thus allow faster repair. Thus according to the example illustrated here, the control unit shall for example be able to determine whether the leak or obstruction is situated between the reservoir and the first projection device or between the first projection device and the second projection device.

Of course, the invention is not limited to the examples that have just been described, and numerous modifications can be made to this example without departing from the scope of the invention. For example, the cleaning system according to the invention may comprise more than two projection devices, or the pump operating parameter may differ from that described, without leaving the context of the present invention, provided that this operating parameter allows determination of a state of the distribution circuit at a given instant.

What is claimed is:

1. A system for cleaning at least two sensors/transmitters for a motor vehicle, the system comprising:
   at least one first projecting device for projecting a cleaning fluid onto at least one first sensor/transmitter,
   at least one second projecting device for projecting the cleaning fluid onto at least one second sensor/transmitter,
   at least one reservoir for storage of the cleaning fluid,
   at least one distribution circuit for distribution of the cleaning fluid, with the distribution circuit connecting the reservoir to the first projecting device and the second projecting device,
   at least one electronic pump, and
   at least one control unit, with the control unit being configured to receive information on a request for activation of the first projection device and the second projection device for projection of the cleaning fluid, in order to determine a desired value of at least one operating parameter of the pump as a function of a length of the distribution circuit extending between the reservoir and the first projection device or the second projection device to be activated, and a desired operating pressure of the first projection device or the second projection device, in order to compare the desired value of the operating parameter of the pump with an actual value of the operating parameter of the pump and in order to determine a state of of the distribution circuit as a function of the result of the comparison.

2. The cleaning system as claimed in claim 1, wherein the control unit is configured for determining information on a leak in the cleaning fluid distribution circuit if the actual value of the operating parameter of the pump is less than the desired value of the operating parameter of the pump, and if the difference between the actual value and the desired value of the operating parameter is greater than or equal to 5% of the desired value of the operating parameter of the pump.

3. The cleaning system as claimed in claim 1, wherein the control unit is configured for determining information on an obstruction in the cleaning fluid distribution circuit if the actual value of the operating parameter of the pump is greater than the desired value of the operating parameter of the pump, and if the difference between the actual value and the desired value of the operating parameter is greater than or equal to 5% of the desired value of the operating parameter of the pump.

4. The cleaning system as claimed in claim 1, wherein the operating parameter of the pump is a rotation speed of the pump or an electrical supply of the pump.

5. The cleaning system as claimed in claim 1, wherein the control unit and the pump are two separate elements.

6. A method for implementing a cleaning system including a control unit, comprising:
   receiving, by the control unit, a request for projection of cleaning fluid at a desired pressure by a first projection device or a second projection device;
   selecting, by the control unit, a selected load loss curve from a plurality of load loss curves, with the selected load loss curve being the one for the plurality of load loss curves corresponding to a distribution circuit extending between a reservoir and the first projection device or the second projection device to be activated; and selecting, by the control unit, an operating curve of a pump to produce an actual pressure as a function of the selected load loss curve.

7. The method as claimed in claim 6, further comprising determining a theoretical electrical supply of the pump corresponding to the operating curve, measuring an actual electrical supply supplied to the pump in order to achieve the operating curve, comparing the theoretical electrical supply of the pump with the actual electrical supply, and determining a state of the distribution circuit as a function of the comparison made between the theoretical electrical supply and the actual electrical supply.

8. The method as claimed in claim 7, further comprising determining a leak is present in the distribution circuit when the actual electrical supply is less than the theoretical electrical supply.

9. The method as claimed in claim 7, further comprising determining an obstruction is present in the distribution circuit when the actual electrical supply is greater than the theoretical electrical supply.

10. A motor vehicle, comprising:
at least one cleaning system, the at least on cleaning system including:
at least one first projecting device for projecting a cleaning fluid onto at least one first sensor/transmitter;
at least one second projecting device for projecting the cleaning fluid onto at least one second sensor/transmitter;
at least one reservoir for storage of the cleaning fluid;
at least one distribution circuit for distribution of the cleaning fluid, with the distribution circuit connecting the reservoir to the first projecting device and the second projecting device;
at least one electronic pump;
at least one control unit, with the control unit being configured to receive information on a request for activation of the first projection device and the second projection device for projection of the cleaning fluid, in order to determine a desired value of at least one operating parameter of the pump as a function of a length of the distribution circuit extending between the reservoir and the first projection device or the second projection device to be activated, and a desired operating pressure of the first projection device or the second projection device, in order to compare the desired value of the operating parameter of the pump with an actua I value of the operating parameter of the pump and in order to determine a state of the distribution circuit as a function of the result of the comparison; and
a plurality of sensors/transmitters, wherein at least one cleaning fluid projection device is associated with each sensor/transmitter, wherein the distribution circuit connects the reservoir to all the devices for projecting the cleaning fluid, and wherein a length of the distribution circuit measured between the reservoir and the at least one first projecting device is different from a length of the distribution circuit measured between the reservoir and the at least one second projecting device.

* * * * *

UNITED STATES PATENT AND TRADEMARK OFFICE
CERTIFICATE OF CORRECTION

PATENT NO. : 12,036,956 B2
APPLICATION NO. : 17/439895
DATED : July 16, 2024
INVENTOR(S) : Frederic Giraud and Alexandre Filloux Page 1 of 1

It is certified that error appears in the above-identified patent and that said Letters Patent is hereby corrected as shown below:

In the Claims

In Claim 1, Column 8, Line 34, replace, ". . . determine a state of of the . . ." with --. . . determine a state of the . . .--

In Claim 10, Column 10, Line 18, replace, " . . . with an actua I value of the . . ." with --. . . with an actual value of the . . .--

Signed and Sealed this
Tenth Day of September, 2024

Katherine Kelly Vidal
*Director of the United States Patent and Trademark Office*